(12) United States Patent
Schmidt et al.

(10) Patent No.: US 10,400,844 B2
(45) Date of Patent: Sep. 3, 2019

(54) DAMPER FOR A VEHICLE HAVING A FLANGE FOR CONNECTING AN EXTERNAL MODULE TUBE

(71) Applicant: ThyssenKrupp Bilstein GmbH, Ennepetal (DE)

(72) Inventors: Klaus Schmidt, Odenthal (DE); Ole Götz, Braunschweig (DE); Bastian Schnerch, Ennepetal (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 15/718,331

(22) Filed: Sep. 28, 2017

(65) Prior Publication Data

US 2018/0017126 A1    Jan. 18, 2018

Related U.S. Application Data

(63) Continuation of application No. 14/649,694, filed as application No. PCT/EP2013/075599 on Dec. 5, 2013, now Pat. No. 9,803,713.

(30) Foreign Application Priority Data

Dec. 7, 2012  (DE) .................. 10 2012 111 938

(51) Int. Cl.
*F16F 9/32*  (2006.01)

(52) U.S. Cl.
CPC ............ *F16F 9/3257* (2013.01); *F16F 9/325* (2013.01); *F16F 9/3235* (2013.01); *F16F 2230/00* (2013.01)

(58) Field of Classification Search
CPC .......... F16F 9/3207; F16F 9/096; F16F 9/325; F16F 9/46; F16F 9/3257;
(Continued)

(56) References Cited

U.S. PATENT DOCUMENTS 4,802,561 A * 2/1989 Knecht ................... F16F 9/465
188/266.6
5,301,776 A * 4/1994 Beck ......................... F16F 9/44
188/266.6
(Continued)

FOREIGN PATENT DOCUMENTS

DE  19527849 C1  8/1996
DE  10355151 A1  6/2005
(Continued)

*Primary Examiner* — Robert A. Siconolfi
*Assistant Examiner* — San M Aung
(74) *Attorney, Agent, or Firm* — The Webb Law Firm

(57) ABSTRACT

A shock absorber having a shock absorber tube (10) is disclosed and has an external module tube (11) which is arranged retentively on the outside of the shock absorber tube (10) by a flange (12), wherein the flange (12) has one or more fluid ducts (13, 14) which fluidically couple the module tube (11) to the shock absorber tube (10). The flange (12) has a plastics body (15) in which the fluid ducts (13, 14) are formed, and the flange (12) furthermore has metallic connecting elements (16, 17) which extend between the shock absorber tube (10) and the module tube (11) and by which the mechanically retentive connection between the shock absorber tube (10) and the module tube (11) is formed.

4 Claims, 2 Drawing Sheets

(58) Field of Classification Search
CPC .......... F16F 2230/0005; F16F 2230/00; F16F 2226/04; F16B 2/08; F16B 7/0433; E04B 2/46; E04B 1/803; B60G 17/005; B60G 17/056; B60G 17/0162; B60G 2200/322; B60G 2202/154; B60G 2204/10; B60G 2204/46; B60G 2204/4605; B60G 2230/022; B60G 2250/11; B60G 2260/24; B60G 2260/26; B60G 2280/012; Y10T 29/49826; Y10T 29/4927; Y10T 29/49615; Y10T 29/49947; Y10T 403/7129; Y10T 403/7141; Y10T 403/7171; Y10T 403/7135; Y10T 403/45; Y10T 403/451; Y10T 403/452; Y10T 403/454; Y10T 403/455; F25D 23/063; F25D 2201/14; Y02A 30/242; Y02B 80/12
USPC ................. 188/314, 322.19, 322.16; 403/31; 29/428, 527.1, 434
See application file for complete search history.

(56) References Cited

U.S. PATENT DOCUMENTS

| | | | | |
|---|---|---|---|---|
| 5,375,683 A | * | 12/1994 | Huang | F16F 9/096 188/266.6 |
| 5,934,421 A | * | 8/1999 | Nakadate | F16F 9/325 188/299.1 |
| 2004/0134730 A1 | * | 7/2004 | Forster | F16F 9/062 188/314 |
| 2015/0300442 A1 | * | 10/2015 | Schmidt | F16F 9/325 188/322.2 |

FOREIGN PATENT DOCUMENTS

| | | |
|---|---|---|
| DE | 112007002377 T5 | 8/2009 |
| DE | 102008062162 B3 | 6/2010 |
| DE | 112008001980 T5 | 7/2010 |
| EP | 1508723 A2 | 2/2005 |
| JP | 791478 A | 4/1995 |
| WO | 2009081363 A1 | 7/2009 |

\* cited by examiner

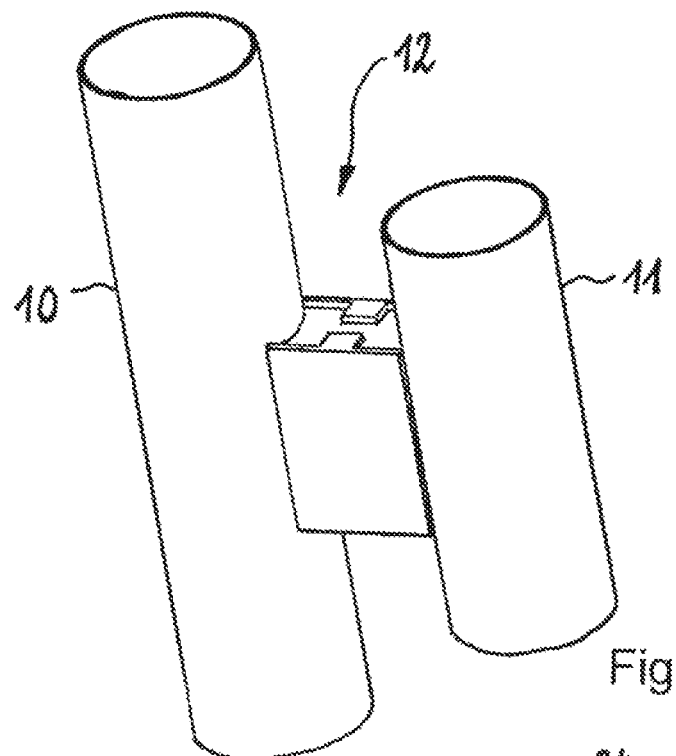
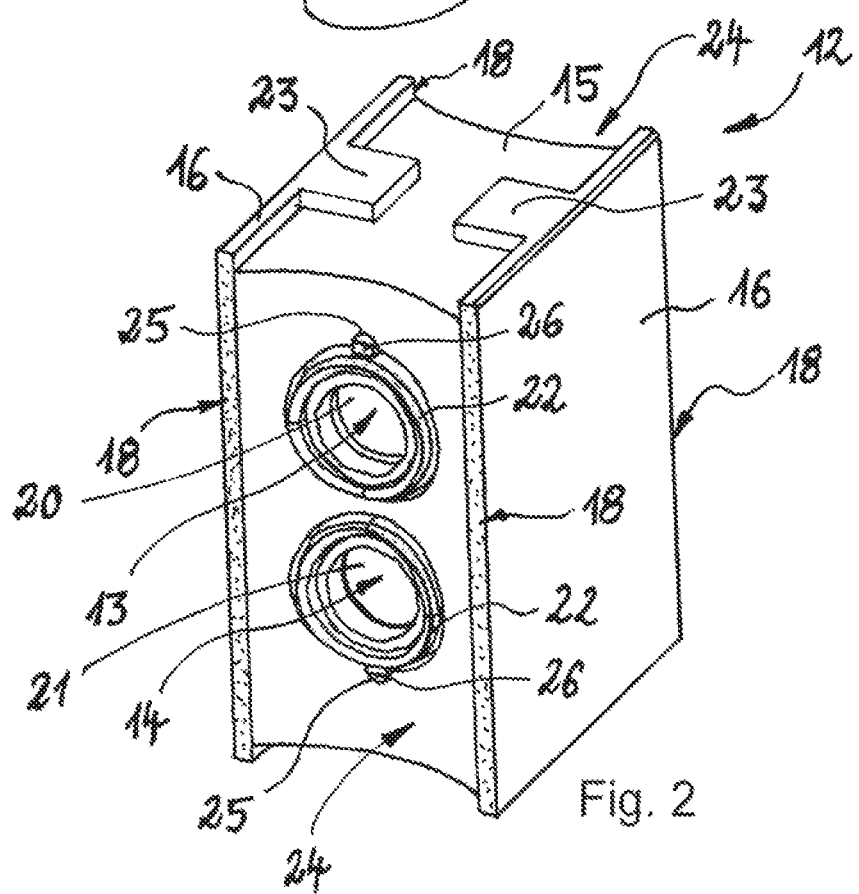

DAMPER FOR A VEHICLE HAVING A FLANGE FOR CONNECTING AN EXTERNAL MODULE TUBE

CROSS-REFERENCE TO RELATED APPLICATIONS

This application is a continuation of U. S. application Ser. No. 14/649,694 filed on Jun. 4, 2015 which is the United States national phase of International Application No. PCT/EP2013/075599 filed Dec. 5, 2013, and claims priority to German Patent Application No. 10 2012 111 938.4 filed Dec. 7, 2012, the disclosures of which are hereby incorporated in their entirety by reference.

BACKGROUND OF THE INVENTION

Field of the Invention

The present invention relates to a shock absorber having a shock absorber tube and having an external module tube which is arranged retentively on the outside of the shock absorber tube by means of a flange, wherein the flange has one or more fluid ducts which fluidically couple the module tube to the shock absorber tube.

Description of Related Art

DE 11 2007 002 377 T5 has disclosed, for example, a shock absorber with a shock absorber tube, and an external module tube is provided in which a further valve arrangement is accommodated. In this case, the module tube extends perpendicular to the shock absorber tube, and the flange for connecting the module tube to the shock absorber tube is formed by the module tube itself.

DE 11 2008 001 980 T5 has disclosed a shock absorber with a shock absorber tube and an external module tube in which a valve body arrangement is accommodated. Between the shock absorber tube and the module tube there are situated transfer rings which form a flange between the two tubes and by means of which the module tube is attached retentively to the shock absorber tube. Fluid ducts are formed through the transfer rings in order to connect the valve body arrangement in the external module tube to the shock absorber tube. In this case, the maximum possible distance between the module tube and the shock absorber tube is structurally limited by the design of the transfer rings.

The connection between the module tube and the shock absorber tube must perform a mechanical retention function in addition to the fluidic connection function. This demands a high level of mechanical strength of the module tube on the shock absorber tube, and if the distance between the module tube and the shock absorber tube has to be increased, for example for structural reasons, it is no longer possible for the flange connection between the module tube and the shock absorber tube to be formed by transfer rings, as these can no longer withstand adequate mechanical load.

It is duly possible for a flange composed of a metallic material to be provided, which makes it possible to realize a high level of strength between the module tube and the shock absorber tube, in particular if the tubes are welded to the flange, but a flange composed for example of a metallic solid material may easily exhibit a high weight. In particular in situations where shock absorber tubes are used as unsprung masses on a vehicle, it is important to realize a low weight of the shock absorber. A flange composed of a plastics material would duly be lighter but would not exhibit the required strength, and the module tube would not be attached to the shock absorber tube with adequate mechanical strength.

If, for example, a flange composed of a metallic solid material is provided, there is also the problem of sealing off the fluid ducts with respect to the tube bodies. The fluid ducts must pass through the flange and be connected to openings formed in the shock absorber tube and in the module tube. If the connection between the flange and the tubes is formed by a welded connection, this makes it difficult to realize sealing between the fluid ducts in the flange and the outer sides of the tubes.

SUMMARY OF THE INVENTION

It is therefore the object of the present invention to provide a shock absorber having a shock absorber tube and having an external module tube, wherein the connection between the module tube and the shock absorber tube is formed by an improved flange which makes it possible to realize a mechanically loadable arrangement of the module tube on the shock absorber tube and which has a low weight. Furthermore, the task of connecting the fluid ducts to the shock absorber tube and to the module tube in pressure-tight fashion must be performed.

Said object is achieved, taking a shock absorber as per the preamble of claim 1 and a flange as per the preamble of claim 9 as a starting point, by means of the respective characterizing features. Advantageous refinements of the invention are specified in the dependent claims.

The invention encompasses the technical teaching that the flange has a plastics body in which the fluid ducts are formed, and that the flange furthermore has metallic connecting elements which extend between the shock absorber tube and the module tube and by means of which the mechanically retentive connection between the shock absorber tube and the module tube is formed.

Here, the invention is based on the concept of creating a flange between a shock absorber tube and an external module tube, hereinafter referred to for simplicity as tubes, which flange has, for the mechanically loadable connection of the two tubes, at least two and preferably multiple metallic connecting elements which extend between the shock absorber tube and the module tube. For the fluidic connection of the two tubes, fluid ducts are provided which are formed in a plastics body. It is thus not necessary for the plastics body to accommodate any mechanical retention forces in order to connect the module tube to the shock absorber tube, and the plastics body can form the fluid ducts in an advantageous manner, without the connecting elements having to be optimized for forming the fluid ducts. The flange thus formed has a low weight, and the metallic connecting elements can be arranged spaced apart from one another around the fluid ducts in the plastics body. The spaced-apart arrangement of the connecting elements consequently yields an improved load situation. The metallic connecting elements may thus be arranged between the two tubes such that the fluid ducts are surrounded by the connecting elements.

In a first possible embodiment, the metallic connecting elements may be formed by plate-shaped metal elements which are preferably of substantially flat form and which are preferably arranged on the outside of the plastics body. The plate-shaped metal elements which are preferably of flat form may have edge regions which point toward the tubes and by means of which they are in particular connected substance bonded, for example by way of a welding process or by way of a brazing process. Here, the plastics body may be arranged between the plate-shaped metal elements, which are oriented parallel to one another, and the edge regions of the plate-shaped metal elements adjoin the shock absorber tube and the module tube. For example, the plate-shaped metal elements may have an identical rectangular form and extend in the longitudinal direction of the tubes. Consequently, the upper and lower sides of the plastics body remain free, and in order to prevent the plastics body from escaping from between the plate-shaped metal elements, the plate-shaped metal elements may have retention tabs which prevent the plastics body from leaving its position between the plate-shaped metal elements, in particular when the shock absorber with the module tube, and consequently also with the flange, is subjected to dynamic load.

In a further possible embodiment, the metallic connecting elements may be formed by connecting strips, formed for example from a metal band material, or by connecting bars formed from bar material, which connecting strips or connecting bars extend with a substantially unchanging cross section between the shock absorber tube and the external module tube. The connecting strips or connecting bars may have a circular, rectangular and preferably flat, band-shaped cross section, and may be produced from a cut-off portion of bar material or band material. For the connection of the two tubes, the connecting strips or connecting bars may consequently extend parallel to one another between the surfaces of the tubes and, for the connection of the connecting strips or connecting bars to the shock absorber tube and to the module tube, said connecting strips or connecting bars may be in particular connected substance bonded by way of their first and second end sides to the tubes. For example, the connecting strips or connecting bars may be welded to the tubes in order to realize the mechanically retentive connection between the tubes.

The arrangement of the metallic connecting elements relative to the plastics body may be realized in a variety of configurations. The connecting elements and the plastics body need not imperatively form a structural unit, and for example, the connecting elements may be arranged outside the plastics body between the shock absorber tube and the module tube. The plate-shaped metal elements may preferably run on the outside of the plastics body, for example in a sandwich type of construction, and the connecting strips or connecting bars may be led through the plastics body, or the connecting strips or connecting bars at least partially likewise extend on the outside of the plastics body between the shock absorber tube and the module tube. It may also be provided that the plastics body has, on the outside, receiving pockets in which the connecting strips or connecting bars are seated. In the same way as connecting elements which are in the form of connecting strips or connecting bars and which may run through the plastics body, it is also possible for the plate-shaped metal elements to be accommodated inside the plastics body, for example by virtue of the plate-shaped metal elements being accommodated by the plastics body by being encapsulated in the plastics material.

The fluid ducts may particularly advantageously be formed by passages in the plastics body. The plastics body may be composed of a fiber-reinforced, strong plastic, for example of fiber-reinforced polyamide, and thus, even in the presence of fluctuating pressures of a fluid conducted through the passages, the pressure loading from the interior of the fluid ducts does not lead to damage to the plastics body. Sealing elements for sealing the passages may be arranged between the plastics body and the shock absorber tube and/or the module tube. The sealing elements may be formed for example by O-ring seals. This yields a very simple embodiment of the flange, in which the fluid ducts are formed by simple passages in the plastics body. In particular, the plastics body may be designed for receiving the sealing elements.

In a further advantageous embodiment, the fluid ducts may also be formed by preferably metallic tube elements which are received in the plastics body. The tube elements may for example be in the form of injection-moulding inserts which are encapsulated in the material of the plastics body during the plastics injection moulding process, and which are thus held in position so as to run between the shock absorber tube and the external module tube. Alternatively, the tube elements may also be inserted into the plastics body after the formation of the latter. It is also possible for sealing elements to be arranged between the tube elements and the shock absorber tube and/or the module tube in order to seal the transition between the tube elements and the shock absorber tube and/or the module tube. If metallic tube elements are used, these can be designed to exhibit greater pressure resistance than passages in the plastics body, and metallic tube elements may be provided for forming the fluid ducts in the plastics body for example if a fluid is to be conducted at high pressure through the fluid ducts, or if, as is preferable, a soft material is selected for forming the plastics body.

The fact that the connecting elements are formed from a metallic material yields the particular advantage that the connecting elements can be welded to the shock absorber tube and to the external module tube. As an alternative to the welding of the connecting elements to the shock absorber tube and to the module tube, brazed connections may also be provided. The welded connections or the brazed connections are produced between the edge sides if the connecting elements are in the form of plate-shaped metal elements, or between the end sides if the connecting elements are in the form of connecting strips or connecting bars, wherein the edge sides of the plate-shaped metal elements or the end sides of the connecting strips or connecting bars are initially arranged in a position between the tubes before the substance bonded connection is produced. In said position, the edge regions of the plate-shaped metal elements or the end sides of the connecting strips or connecting bars face the surface of the tubes, such that the connection can be produced by way of a welding process or by way of a brazing process.

In yet another embodiment, it is possible for at least a clamp, a sleeve or the like to be provided which jointly encloses the shock absorber tube and the module tube, and when the clamp or the flange is braced, the tubes can be pressed against the respective abutment sides, facing toward the tubes, of the flange. It is possible in this way, too, to form a mechanically loadable and fluid-tight arrangement of a flange between the shock absorber tube and the module tube, and a substance bonded connection, for example, between the flange and the tubes can be omitted.

The present invention is also directed to a flange for connecting a shock absorber tube to an external module tube of a shock absorber, wherein the flange has one or more fluid ducts by which the module tube can be fluidically connected to the shock absorber tube, and it is provided that the flange has at least one plastics body in which the fluid ducts are formed, and that the flange has metallic connecting elements which extend between the shock absorber tube and the module tube and by means of which the mechanically retentive connection between the shock absorber tube and the module tube is formed. The further features and associated advantages described above in conjunction with the shock absorber self-evidently apply equally to the flange according to the invention. In particular, the fluid ducts may be formed by passages in the plastics body of the flange; alternatively, preferably metallic tube elements, which form the fluid ducts, may be arranged in the plastics body.

The metallic connecting elements may be formed substantially by plate-shaped metal elements of flat form, wherein preferably two plate-shaped metal elements may be provided which are arranged in parallel on the outside of the plastics body. Alternatively, the plate-shaped metal elements may also be received in the plastics body, for example by virtue of the metal elements being encapsulated in the material of the plastics body.

It may furthermore be provided that the metallic connecting elements are formed by connecting strips or connecting bars which extend with a substantially unchanging cross section, and preferably parallel to one another, through or to the side of the plastics body; in particular, 2 to 20, preferably 3 to 15 and more preferably 4 to 10 and particularly preferably 6 connecting strips or connecting bars may be provided. In particular if two fluid ducts extend parallel to one another through the flange, it is possible, in the case of the arrangement of 6 connecting strips or connecting bars, for each of the two fluid ducts to be surrounded by 4 connecting strips or connecting bars. The 6 connecting strips or connecting bars may in this case extend in two rows of in each case 3 connecting strips or connecting bars through the plastics body, with the result that 4 connecting strips or connecting bars surround a respective fluid duct.

BRIEF DESCRIPTION OF THE DRAWINGS

Further measures which improve the invention will be discussed in more detail below in conjunction with the description of preferred exemplary embodiments of the invention and with reference to the figures. In the figures:

FIG. 1 shows a perspective view of a shock absorber with a shock absorber tube, a module tube and a flange which connects the tubes, as per a first possible embodiment, FIG. 2 shows a perspective view of the flange as per the first embodiment in FIG. 1.

DESCRIPTION OF THE INVENTION

Figure 3:
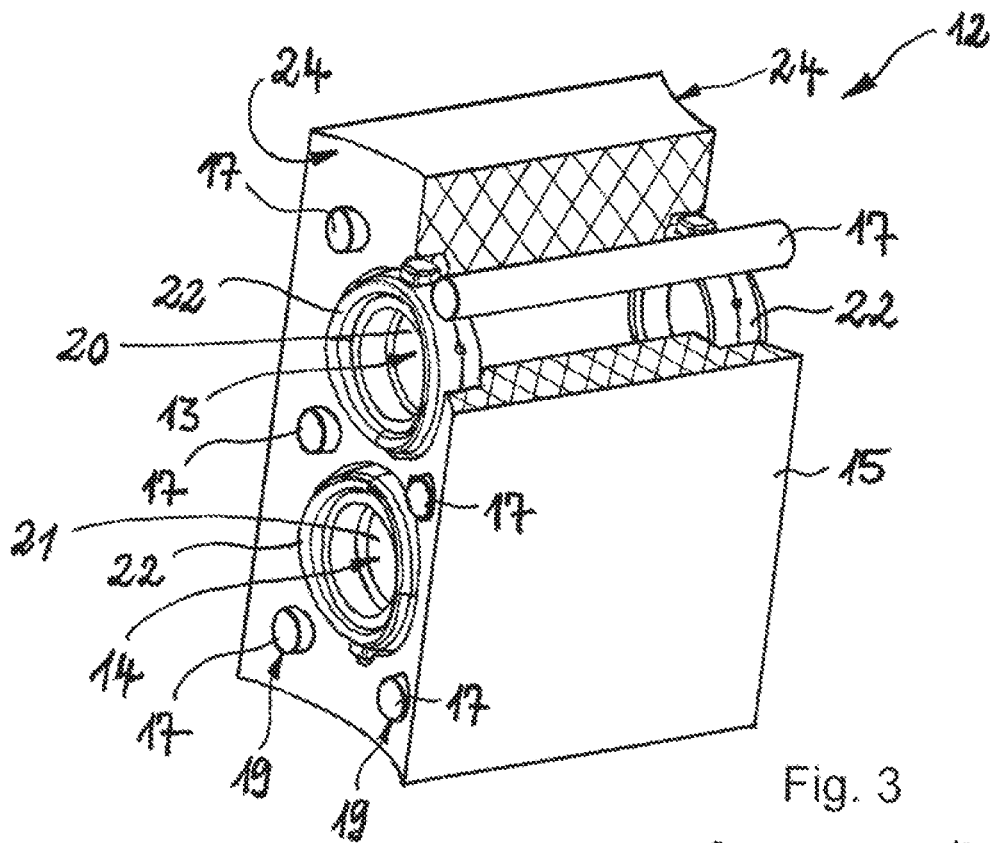
FIG. 3 shows a sectional view of the flange as per a further embodiment.

FIG. 1 shows, as a first exemplary embodiment and in a perspective view, parts of a shock absorber having a shock absorber tube 10 and having an external module tube 11, and a flange 12 is arranged between the shock absorber tube 10 and the external module tube 11. The flange 12 connects the module tube 11 to the shock absorber tube 10, such that the module tube 11 is held mechanically on the shock absorber tube 10 by way of the flange 12. The shock absorber tube 10 and the module tube 11 are shown merely schematically, and in the module tube 11 there may be accommodated, for example, a valve assembly which fluidically communicates with the shock absorber tube 10 via fluid ducts in the flange 12. Alternatively, in the module tube 11, there may be formed an additional absorber volume, which likewise requires fluid ducts in the flange 12 in order to fluidically communicate with the shock absorber tube 10. The first exemplary embodiment of the flange 12 is illustrated in detail in the following FIG. 2.

FIG. 2 shows a first possible exemplary embodiment of a flange 12 for connecting a shock absorber tube 10 to an external module tube 11, as shown in FIG. 1. The flange 12 has a plastics body 15 in which, through the formation of passages 20 and 21 in the plastics body 15, the fluid ducts 13 and 14 are formed, which run parallel to one another through the plastics body 15. In this case, the fluid ducts 13 and 14 extend between two abutment sides 24 of the flange 12, and it can be seen that the abutment sides 24 have a curvature which is adapted to the curvature of the outer side of the shock absorber tube 10 and of the external module tube 11 respectively.

Furthermore, the flange has metallic connecting elements 16 which, in the first exemplary embodiment which is shown, are in the form of plate-shaped metal elements 16. The plate-shaped metal elements 16 run parallel to one another, and the plastics body 15 is situated between the plate-shaped metal elements 16. The plate-shaped metal elements 16 consequently form side cheeks of the plastics body 15, and serve for the mechanically retentive connection of the external module 11 to the shock absorber tube 10. To produce the connection between the plate-shaped metal elements 16 and the shock absorber tube 10 and the external module tube 11 respectively, the plate-shaped metal elements 16 have edge regions 18 by way of which the plate-shaped metal elements 16 can be welded, for example, to the outer surface of the shock absorber tube 10 and of the external module tube 11.

The region in which the fluid ducts 13 and 14 open into the abutment sides 24 of the plastics body 15 has sealing elements 22 which are received in the plastics body 15, for example in depressions which are not shown in any more detail. The receiving depressions for receiving the sealing elements 22 in the plastics body 15 comprise, at a predefined circumferential position, grooves 25 into which lugs 26 arranged on the sealing elements 22 are seated in order to ensure radial orientation of the sealing elements 22. This may be necessary since the abutment sides 24 of the flange 12 are adapted to the curvature of the tube outer side of the tubes 10, 11, whereby the sealing elements 22 may exhibit a varying cord thickness and are thus likewise adapted to the curvature of the tube outer sides, whereby said sealing elements require radial orientation.

If the plate-shaped metal elements 16 are welded between the tubes 10, 11, retention tabs 23 ensure that the plastics body 15 does not move out of its position between the plate-shaped metal elements 16 during the operation of the shock absorber. The retention tabs 23 are integrally formed for example on those edges of the plate-shaped metal elements 16 which extend between the tubes 10, 11, and said retention tabs may likewise be provided on the lower side of the plastics body 15 in the manner visible on the upper side.

Figure 4:
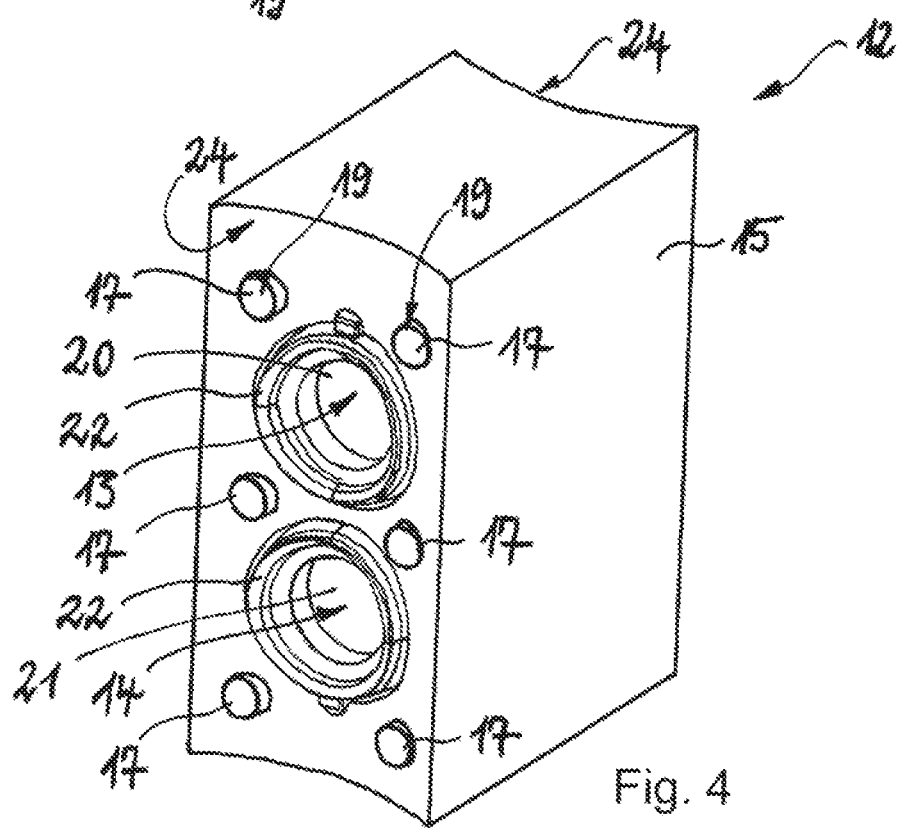
FIG. 4 shows a perspective, non-sectional view of the flange as per the further embodiment in FIG. 3.

FIGS. 3 and 4 show a further exemplary embodiment of a flange 12 for connecting an external module tube 11 to a shock absorber tube 10 of a shock absorber. Here, FIG. 3 shows the plastics body 15 in section, and FIG. 4 shows a view of the complete plastics body 15. The fluid ducts 13 and 14 are formed by passages 20 and 21 in the plastics body 15 and run parallel to one another through the plastics body 15 and extend between the two abutment sides 24 of the plastics body 15, by way of which said fluid ducts adjoin the tubes 10 and 11. At the ends, the fluid ducts 13 and 14 are provided with sealing elements 22.

The second exemplary embodiment of the flange 12 shows metallic connecting elements 17 in the form of connecting bars 17 which, by way of example, extend through the plastics body 15. In this case, the connecting bars 17 have a length such that they extend between the respective abutment sides 24 of the plastics body 15, and by way of end sides 19 provided on the connecting bars 17, said end sides being shown for example on the in each case two upper connecting bars 17, the connecting bars 17 are connected to the shock absorber tube 10 and to the external module tube 11, for example by way of a welding process.

The exemplary embodiment shows six connecting bars 17 which extend parallel to one another through the plastics body 15, and the connecting bars 17 are arranged in two rows in each case in pairs at the same height, such that each of the fluid ducts 13 and 14 is enclosed by four connecting bars 17.

The exemplary embodiment shows connecting bars 17 which extend through the plastics body 15, and it may alternatively be provided that the connecting bars 17 run outside the plastics body 15. For example, the plastics body 15 may have, on the outside, receiving pockets into which the connecting bars 17 may be inserted. The connecting bars 17 shown have a circular cross section; they may likewise also be in the form of rectangular, for example even flat, connecting bars 17.

A further exemplary embodiment of a flange 12 may have metallic connecting elements 16, 17 which are composed both of plate-shaped metal elements 16 and of connecting bars 17, such that the flange 12 combines both forms of connecting elements 16, 17. The plate-shaped metal elements 16 may in this case also be applied to the upper and lower sides of the plastics body 15 in relation to the direction of extent of the two tubes 10, 11. The advantage of the simple producibility of the flange 12, and in particular of the metallic connecting elements 16, 17, is attained in particular if the connecting elements 16, 17 can be cut to length from a band material or bar material provided in endless form, such that the metallic connecting elements 16, 17 preferably have an unchanging cross section over their entire length between the two tubes 10, 11.

The invention is not restricted, with regard to its embodiment, to the preferred exemplary embodiments specified above. Rather, numerous variants are conceivable which make use of the presented solution even in fundamentally different embodiments. All of the features and/or advantages which emerge from the claims, the description or the drawings, including structural details or spatial arrangements, may be essential to the invention both individually and in a wide variety of combinations.

LIST OF REFERENCE NUMERALS

10 Shock absorber tube
11 External module tube
12 Flange
13 Fluid duct
14 Fluid duct
15 Plastics body
16 Metallic connecting element, plate-shaped metal element
17 Metallic connecting element, connecting bar
18 Edge region of the plate-shaped metal element
19 End side of the connecting bar
20 Passage
21 Passage
22 Sealing element
23 Retention tab
24 Abutment side
25 Groove
26 Lug

The invention claimed is:

1. A shock absorber comprising a shock absorber tube and an external module tube which is arranged retentively on the outside of the shock absorber tube by a flange, wherein the flange has one or more fluid ducts which fluidically couple the module tube to the shock absorber tube,
   wherein the flange has a plastic body in which the fluid ducts for the fluidic coupling are formed, and wherein the flange has metallic connecting elements which extend between the shock absorber tube and the module tube and by which the retentive connection between the shock absorber tube and the module tube is formed,
   wherein the metallic connecting elements are formed by plate-shaped metal elements which are arranged on the outside of and in contact engagement with the plastic body to form the sides of the plastic body, and
   wherein the retentive connection between the external module and the shock absorber tube is formed by fixedly securing the plate-shaped metal elements to the external module and the shock absorber tube.

2. The shock absorber as claimed in claim 1, wherein the plate-shaped metal elements have edge regions by which the plate-shaped metal elements are substance bonded to the shock absorber tube and to the external module tube.

3. The shock absorber as claimed in claim 1, wherein two plate-shaped metal elements are provided which are arranged in parallel on the outside of the plastic body.

4. The shock absorber as claimed in claim 3, wherein the plate-shaped metal elements have retention tabs that engage the plastic body to retain the plastic body in place between the plate-shaped metal elements during the operation of the shock absorber tube.

* * * * *